(12) United States Patent
Cheng et al.

(10) Patent No.: US 10,170,925 B2
(45) Date of Patent: Jan. 1, 2019

(54) INTELLIGENT UNINTERRUPTIBLE POWER CHARGING APPARATUS AND METHOD OF OPERATING THE SAME

(71) Applicant: Delta Electronics, Inc., Taoyuan (TW)

(72) Inventors: Chung-Chieh Cheng, Taoyuan (TW); Kun-Jang Kuo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 8 days.

(21) Appl. No.: 15/641,972

(22) Filed: Jul. 5, 2017

(65) Prior Publication Data

US 2018/0287409 A1 Oct. 4, 2018

(30) Foreign Application Priority Data

Mar. 31, 2017 (TW) .............................. 106110976 A

(51) Int. Cl.
*H02J 7/00* (2006.01)
*H02J 7/02* (2016.01)
*H02J 9/06* (2006.01)
*H02M 3/335* (2006.01)

(52) U.S. Cl.
CPC .......... *H02J 7/0072* (2013.01); *H02J 7/0029* (2013.01); *H02J 7/0068* (2013.01); *H02J 7/022* (2013.01); *H02J 9/061* (2013.01); *H02M 3/33507* (2013.01); *H02J 2007/0039* (2013.01)

(58) Field of Classification Search
CPC .......... H02M 3/07; H02M 2001/0009; H02M 2001/0032; H02M 3/156; H02M 3/33546; H02M 3/33507; H02M 3/1582; H02M 1/4208; H02J 9/061; H02J 7/0068; H02J 1/14; H02J 3/06
USPC ................................ 320/107, 121, 123, 128
See application file for complete search history.

(56) References Cited

U.S. PATENT DOCUMENTS 6,977,448 B2 * 12/2005 Kanouda ................. H02J 9/061
307/52
2015/0214784 A1 * 7/2015 Alexander ................ H02J 9/00
307/22

* cited by examiner

Primary Examiner — Nghia Doan
(74) Attorney, Agent, or Firm — Muncy, Geissler, Olds & Lowe, P.C.

(57) ABSTRACT

An intelligent uninterruptible power charging apparatus includes an uninterruptible power module, a charging module, and an output port. The uninterruptible power module provides a first charging power source. The charging module converts the first charging power source into a second charging power source and outputs the second charging power source through the output port. When an electronic apparatus is connected to the output port, the charging module receives an identification signal outputted from the electronic apparatus and adjusts a voltage level of the second charging power source according to the identification signal.

20 Claims, 10 Drawing Sheets

INTELLIGENT UNINTERRUPTIBLE POWER CHARGING APPARATUS AND METHOD OF OPERATING THE SAME

BACKGROUND

Technical Field

The present invention relates to an intelligent uninterruptible power charging apparatus and a method of operating the same, and more particularly to an intelligent uninterruptible power charging apparatus and a method of operating the same are provided to adjust voltage levels of an output voltage of the intelligent uninterruptible power charging apparatus.

Description of Related Art

Recently, with the popularity of mobile electronic devices, such as smart phones, tablet computers, and so on, it is important to meet charging requirements for mobile electronic devices. Among the various charging devices, the popularization rate of using USBs as charging interfaces is increased.

However, the existing charging device with a USB interface can only provide a single output voltage level, and therefore it is not enough to meet charging requirements for mobile electronic devices. In addition, the existing uninterruptible power system does not integrate and coordinate the charging devices with USB interfaces which can provide adjustable output voltage levels. Therefore, the output power electricity of the uninterruptible power system fails to charge the mobile electronic devices, thereby reducing convenience of using the mobile electronic devices and failing to meet charging requirements for mobile electronic devices.

SUMMARY

In order to solve the above-mentioned problem, the present invention provides an intelligent uninterruptible power charging apparatus. The intelligent uninterruptible power charging apparatus includes an uninterruptible power module, a charging module, and an output port. The charging module is connected to the uninterruptible power module. The output port is connected to the charging module. The uninterruptible power module provides a first charging power source. The charging module converts the first charging power source into a second charging power source and outputs the second charging power source through the output port. When an electronic apparatus is connected to the output port, the charging module receives an identification signal outputted from the electronic apparatus and adjusts a voltage level of the second charging power source according to the identification signal.

In one embodiment, the uninterruptible power module receives a first power source and the first power source is provided to charge an energy storage unit through a first path. When the uninterruptible power module does not receive the first power source, the energy storage unit outputs a second power source through a second path so that the second power source is outputted from the uninterruptible power module.

In one embodiment, the first path includes an AC-to-DC conversion unit. The AC-to-DC conversion unit converts the first power source into a first DC power source and delivers the first DC power source to the energy storage unit. The charging module is connected to a path between the first power source and the AC-to-DC conversion unit, and the first power source is to be the first charging power source and the first charging power source is outputted from the uninterruptible power module to the charging module.

In one embodiment, the first path includes an AC-to-DC conversion unit. The AC-to-DC conversion unit converts the first power source into a first DC power source and delivers the first DC power source to the energy storage unit. The charging module is connected to a path between the AC-to-DC conversion unit and the energy storage unit, and the first DC power source provided by the AC-to-DC conversion unit or the first DC power source provided by the energy storage unit is to be the first charging power source, and the first charging power source is outputted from the uninterruptible power module to the charging module.

In one embodiment, the second path includes a DC-to-AC conversion unit. The DC-to-AC conversion unit receives a second DC power source outputted from the energy storage unit and converts the second DC power source into the second power source. The charging module is connected to a path between the energy storage unit and the DC-to-AC conversion unit, and the second DC power source provided by the energy storage unit is to be the first charging power source and the first charging power source is outputted from the uninterruptible power module to the charging module.

In one embodiment, the second path includes a DC-to-AC conversion unit. The DC-to-AC conversion unit receives a second DC power source outputted from the energy storage unit and converts the second DC power source into the second power source. The charging module is connected to a path between the DC-to-AC conversion unit and the second power source, and the first power source or the second power source provided by the DC-to-AC conversion unit is to be the first charging power source and the first charging power source is outputted from the uninterruptible power module to the charging module.

In one embodiment, the uninterruptible power module receives a first power source and converts the first power source into a second power source through a first AC-to-DC conversion unit, and the first power source is provided to charge an energy storage unit through a first path. When the uninterruptible power module does not receive the first power source, the energy storage unit outputs the second power source through a second path so that the second power source is outputted from the uninterruptible power module.

In one embodiment, the first path includes a second AC-to-DC conversion unit. The second AC-to-DC conversion unit converts the first power source into a first DC power source and delivers the first DC power source to the energy storage unit. The charging module is connected to a path between the first power source and the second AC-to-DC conversion unit, and the first power source is to be the first charging power source and the first charging power source is outputted from the uninterruptible power module to the charging module.

In one embodiment, the first path includes a second AC-to-DC conversion unit. The second AC-to-DC conversion unit converts the first power source into a first DC power source and delivers the first DC power source to the energy storage unit. The charging module is connected to a path between the second AC-to-DC conversion unit and the energy storage unit, and the first DC power source provided by the second AC-to-DC conversion unit or the first DC power source provided by the energy storage unit is to be the first charging power source, and the first charging power source is outputted from the uninterruptible power module to the charging module.

In one embodiment, the second path includes a DC-to-DC conversion unit. The DC-to-DC conversion unit receives a second DC power source outputted from the energy storage unit and converts the second DC power source into the second power source. The charging module is connected to a path between the energy storage unit and the DC-to-DC conversion unit, and the second DC power source provided by the energy storage unit is to be the first charging power source and the first charging power source is outputted from the uninterruptible power module to the charging module.

In one embodiment, the second path includes a DC-to-DC conversion unit. The DC-to-DC conversion unit receives a second DC power source outputted from the energy storage unit and converts the second DC power source into the second power source. The charging module is connected to a path between the DC-to-DC conversion unit and the second power source, and the second power source provided by the first AC-to-DC conversion unit or the second power source provided by the DC-to-DC conversion unit is to be the first charging power source, and the first charging power source is outputted from the uninterruptible power module to the charging module.

In one embodiment, the charging module includes a conversion unit and a detection unit. The conversion unit is connected between the uninterruptible power module and the output port. The detection unit is connected between the conversion unit and the output port. When the electronic apparatus is connected to the output port, the detection unit receives the identification signal outputted from the electronic apparatus and outputs a first control signal to the conversion unit according to the identification signal. The conversion unit receives the first charging power source and the first control signal, converts the first charging power source into the second charging power source, and adjusts the voltage level of the second charging power source according to the first control signal.

In one embodiment, the charging module further includes a protection unit. The protection unit is connected between the conversion unit and the detection unit or integrated in the detection unit. When the protection unit detects that the conversion unit is abnormal, the protection unit outputs a protection signal to the detection unit, and the detection unit outputs a second control signal to the conversion unit and controls the conversion unit not to output the second charging power source.

In one embodiment, the protection unit includes an over-voltage detection circuit, an over-current detection circuit, a short-circuit current detection circuit, or an over-temperature detection circuit. The over-voltage detection circuit, the over-current detection circuit, the short-circuit current detection circuit, or the over-temperature detection circuit detects a voltage state, a current state, or a temperature state of the conversion unit. When the protection unit detects that the conversion unit occurs an over-voltage condition, an over-current condition, a short-circuit current condition, or an over-temperature condition, the protection unit outputs the protection signal to the detection unit.

In one embodiment, the conversion unit is an isolated converter with a primary side and a secondary side. The protection unit is connected to the primary side of the isolated converter.

In one embodiment, the conversion unit is an isolated converter with a primary side and a secondary side. The protection unit is connected to the secondary side of the isolated converter.

In one embodiment, the output port includes a detection pin. The detection pin is connected to the detection unit and to detect whether the electronic apparatus is connected to the output port. When the electronic apparatus is connected to the output port, the detection pin is connected to a ground pin of the output port and the detection pin and the ground pin are simultaneously grounded, and the conversion unit outputs the second charging power source to the electronic apparatus. When the electronic apparatus is not connected to the output port, the detection pin is not connected to the ground pin of the output port, and the second charging power source is not outputted from the conversion unit.

In order to solve the above-mentioned problem, the present invention provides a method of operating an intelligent uninterruptible power charging apparatus having an uninterruptible power module and a charging module. The method includes steps of: (a) receiving a first power source and generating a first charging power source according to the first power source by the uninterruptible power module; (b) converting the first charging power source into a second charging power source by the charging module; (c) receiving an identification signal outputted from an electronic apparatus when the electronic apparatus is connected to the charging module, and adjusting a voltage level of the second charging power source according to the identification signal by the charging module; and (d) determining whether the charging module is abnormal according to a protection signal by the intelligent uninterruptible power charging apparatus, and not outputting the second charging power source from the charging module when the charging module is abnormal.

In one embodiment, after the step (b) further includes a step of: (b1) charging an energy storage unit of the uninterruptible power module by the first power source when the uninterruptible power module receives the first power source; receiving the first power source or the first charging power source generated from the energy storage unit by the charging module, and outputting the second charging power source to the electronic apparatus.

In one embodiment, the step (c) further includes a step of: (c1) determining whether the electronic apparatus is connected to the charging module through a detection pin; outputting the second charging power source from the charging module to the electronic apparatus when the electronic apparatus is connected to the charging module; not outputting the second charging power source from the charging module when the electronic apparatus is not connected to the charging module.

It is to be understood that both the foregoing general description and the following detailed description are exemplary, and are intended to provide further explanation of the present invention as claimed. Other advantages and features of the present invention will be apparent from the following description, drawings and claims.

BRIEF DESCRIPTION OF DRAWING

The present invention can be more fully understood by reading the following detailed description of the embodiment, with reference made to the accompanying drawings as follows.

DETAILED DESCRIPTION

Figure 1A:
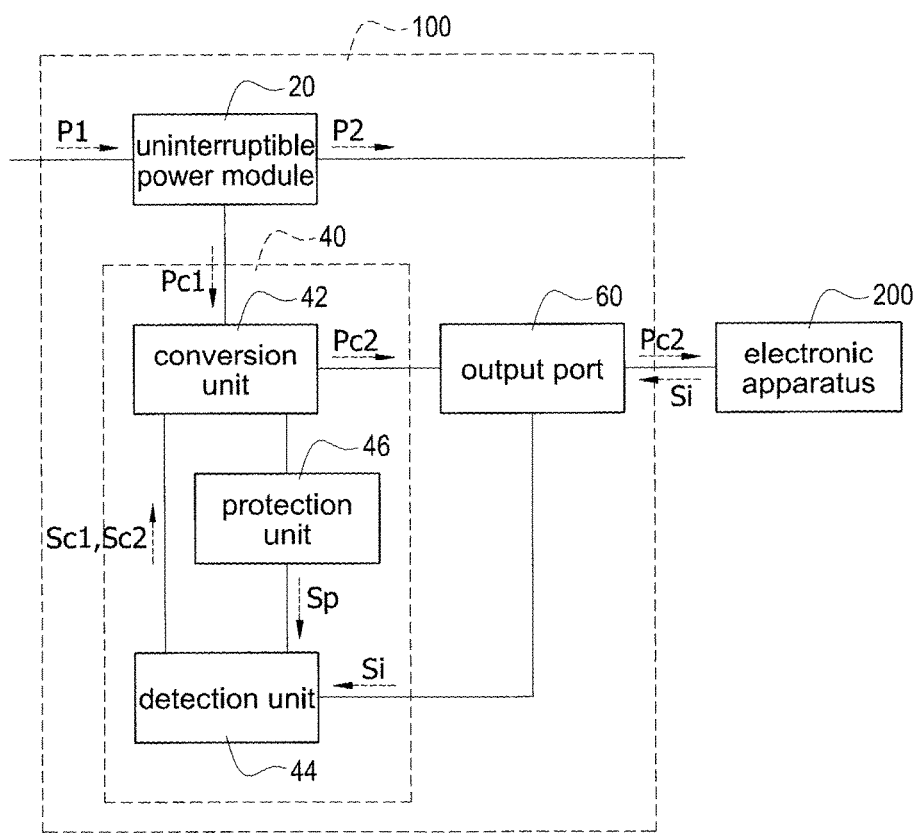
FIG. 1A shows a schematic circuit block diagram of an intelligent uninterruptible power charging apparatus according to a first embodiment of the present invention.

Reference will now be made to the drawing figures to describe the present invention in detail. It will be understood that the drawing figures and exemplified embodiments of present invention are not limited to the details thereof.

Refer to FIG. 1A, which shows a schematic circuit block diagram of an intelligent uninterruptible power charging apparatus according to a first embodiment of the present invention. The intelligent uninterruptible power charging apparatus 100 includes an uninterruptible power module 20, a charging module 40, and an output port 60. The uninterruptible power module 20 receives a first power source P1 and generates a first charging power source Pc1 according to the first power source P1. The charging module 40 is connected to the uninterruptible power module 20, and the charging module 40 receives the first charging power source Pc1 and converts the first charging power source Pc1 into a second charging power source Pc2. The output port 60 is connected to the charging module 40, and the second charging power source Pc2 is outputted to an electronic apparatus 200 through the output port 60 when the electronic apparatus 200 is externally connected to the output port 60. After the electronic apparatus 200 receives the second charging power source Pc2, the electronic apparatus 200 outputs an identification signal Si to the charging module 40 through the output port 60. After the charging module 40 receives the identification signal Si, the charging module 40 adjusts a voltage level of the second charging power source Pc2 according to the identification signal Si. More specifically, the charging module 40 can, for example but not limited to, output different voltage levels of the second charging power source Pc2, such as but not limited to 5 volts, 9 volts, 12 volts, 15 volts, 20 volts, or other appropriate voltage levels. When the charging module 40 receives the identification signal Si to realize the required voltage level of the electronic apparatus 200, the charging module 40 adjusts the second charging power source Pc2 to meet the required voltage level for the electronic apparatus 200, such as 5-volt second charging power source Pc2 is adjusted to 20-volt second charging power source Pc2. In this embodiment, the output port 60 is a USB port or the output port 60 can be other different types of transmission ports so as to flexibly and generally apply to the electronic apparatuses 200 with different charging interfaces.

The charging module 40 includes a conversion unit 42 and a detection unit 44. The conversion unit 42 is connected between the uninterruptible power module 20 and the output port 60, and the conversion unit 42 converts the first charging power source Pc1 into the second charging power source Pc2. The detection unit 44 is connected between the conversion unit 42 and the output port 60, and the detection unit 44 receives the identification signal Si and outputs a first control signal Sc1 to the conversion unit 42. When the electronic apparatus 200 is connected to the output port 60, the conversion unit 42 outputs the second charging power source Pc2 to the electronic apparatus 200 through the output port 60. The detection unit 44 receives the identification signal Si through the output port 60 and outputs the first control signal Sc1 to the conversion unit 42 according to the identification signal Si. After the conversion unit 42 receives the first control signal Sc1, the conversion unit 42 adjusts the voltage level of the second charging power source Pc2 according to the first control signal Sc1.

The charging module 40 further includes a protection unit 46 which is connected between the conversion unit 42 and the detection unit 44. When the protection unit 46 detects that the conversion unit 42 is abnormal, the protection unit 46 outputs a protection signal Sp to the detection unit 44. The detection unit 44 outputs a second control signal Sc2 to the conversion unit 42 according to the protection signal Sp and controls the conversion unit 42 not to output the second charging power source Pc2 so as to stop charging the electronic apparatus 200 through the output port 60 by the charging module 40.

Figure 1B:
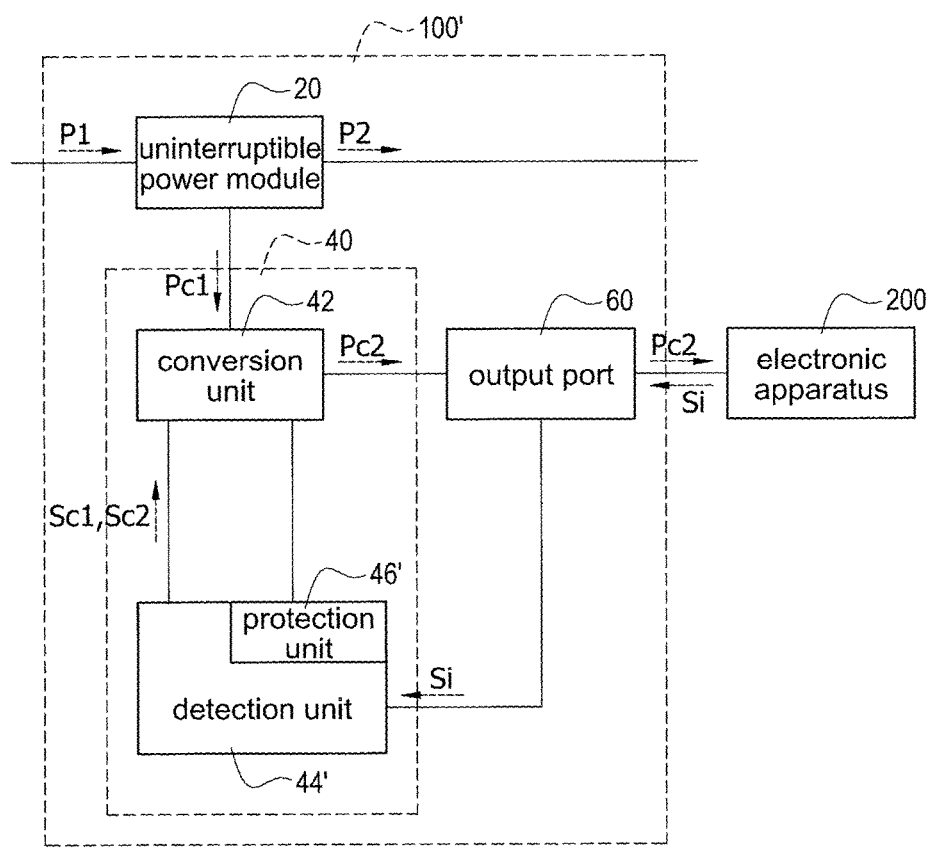
FIG. 1B shows a schematic circuit block diagram of the intelligent uninterruptible power charging apparatus according to a second embodiment of the present invention.

Refer to FIG. 1B, which shows a schematic circuit block diagram of the intelligent uninterruptible power charging apparatus according to a second embodiment of the present invention. With reference also to FIG. 1A. The difference between the intelligent uninterruptible power charging apparatus 100' shown in FIG. 1B and the intelligent uninterruptible power charging apparatus 100 shown in FIG. 1A is that the protection unit 46' is integrated in the detection unit 44' shown in FIG. 1B. When the protection unit 46' detects that the conversion unit 42 is abnormal, the detection unit 44' outputs the second control signal Sc2 to the conversion unit 42 and controls the conversion unit 42 not to output the second charging power source Pc2 so as to stop charging the electronic apparatus 200 through the output port 60 by the charging module 40.

Figure 1C:
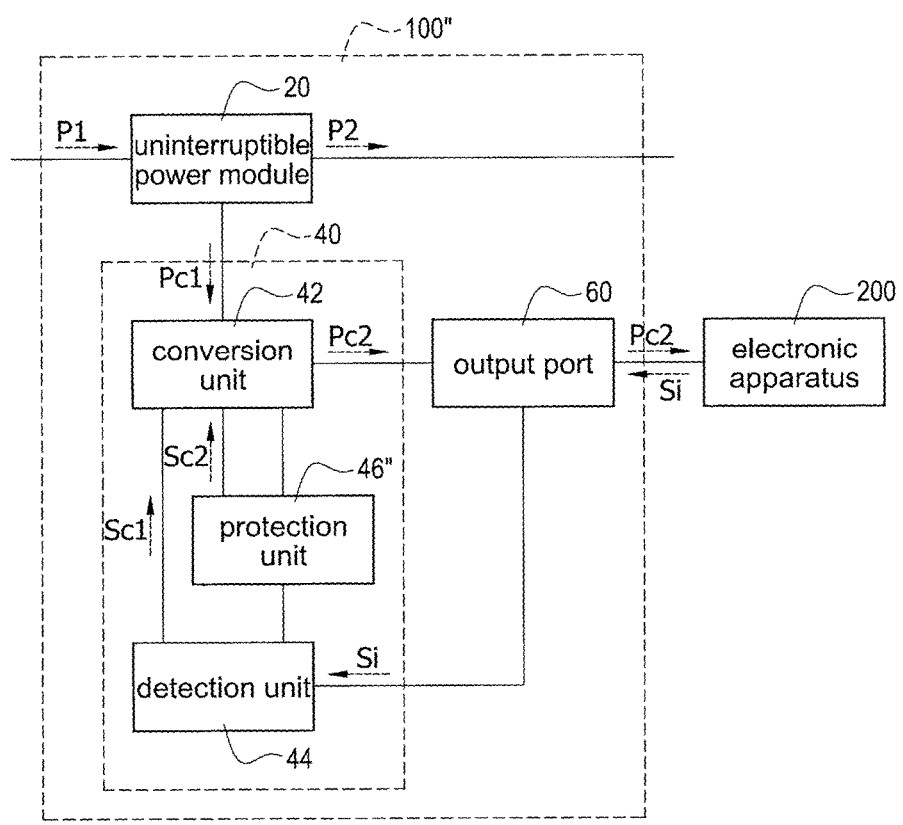
FIG. 1C shows a schematic circuit block diagram of the intelligent uninterruptible power charging apparatus according to a third embodiment of the present invention.

Refer to FIG. 1C, which shows a schematic circuit block diagram of the intelligent uninterruptible power charging apparatus according to a third embodiment of the present invention. With reference also to FIG. 1A and FIG. 1B. The difference between the intelligent uninterruptible power charging apparatus 100" shown in FIG. 1C and the intelligent uninterruptible power charging apparatuses 100, 100' shown in FIG. 1A and FIG. 1B is that the protection unit 46" is connected to the conversion unit 42 shown in FIG. 1C. When the protection unit 46" detects that the conversion unit 42 is abnormal, the protection unit 46" outputs the second control signal Sc2 to the conversion unit 42 and controls the conversion unit 42 not to output the second charging power source Pc2 so as to stop charging the electronic apparatus 200 through the output port 60 by the charging module 40. The detail operations of the protection unit 46, 46', 46" are described below.

Figure 2:
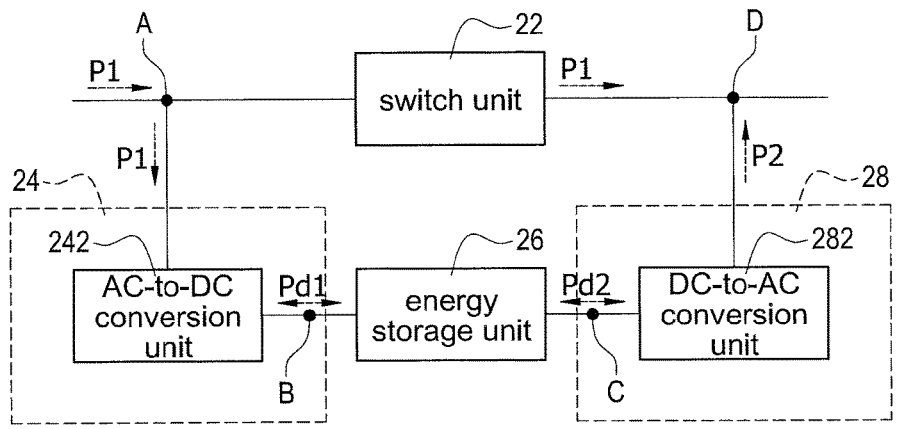
FIG. 2 shows a schematic circuit block diagram of an uninterruptible power module according to a first embodiment of the present invention.

Refer to FIG. 2, which shows a schematic circuit block diagram of an uninterruptible power module according to a first embodiment of the present invention. With reference also to FIG. 1A, FIG. 1B, and FIG. 1C. The uninterruptible power module 20 includes a switch unit 22, a first path 24, an energy storage unit 26, and a second path 28. When the uninterruptible power module 20 receives the first power source P1, the uninterruptible power module 20 charges the energy storage unit 26 through the first path 24, and the switch unit 22 is turned on so that the first power source P1 is outputted from the uninterruptible power module 20. When the uninterruptible power module 20 does not receive the first power source P1, the switch unit 22 is not turned on and a second power source P2 is outputted from the energy storage unit 26 through the second path 28 so that the second power source P2 is outputted from the uninterruptible power module 20. As shown in FIG. 1A to FIG. 1C and FIG. 2, the charging module 40 may be connected to any one of connection points A-D inside the uninterruptible power module 20, namely the connection points A-D are charging connection locations. The charging module 40 receives the first charging power source Pc1 which is generated from the first power source P1, the energy storage unit 26, or the second power source P2, converts the first charging power source Pc1 into the second charging power source Pc2, and outputs the second charging power source Pc2 to the electronic apparatus 200 through the output port 60.

In this embodiment, a single charging module 40 or multiple charging modules 40 can be connected to any one of the connection points A-D of the uninterruptible power module 20. When multiple charging modules 40 are used in the intelligent uninterruptible power charging apparatus 100, one or more than one connection points (charging connection locations) of the uninterruptible power module 20 are used. For example, one charging module 40 is connected to a connection point A and another charging module 40 is connected a connection point C, or multiple charging modules 40 are connected to a connection point A. Accordingly, the charging modules 40 can be flexibly connected to different connection points (charging connection locations) of the uninterruptible power module 20 so as to increase the practicality and adaptability of the intelligent uninterruptible power charging apparatus 100.

In this embodiment, the switch unit 22 is, for example but not limited to, a double-contact switch to provide an on/off operation. In other words, the switch unit 22 may be a triple-contact switch with two input ends and one output end. For example, one of the input ends is used to receive the first power source P1 and the other of the input ends is used to receive the second power source P2, and the output end is selectively connected to one of the input ends. In this embodiment, the energy storage unit 26 is, for example but not limited to, a pluggable or expandable chargeable unit or power storage device, such as a lithium battery or a lead-acid battery.

In this embodiment, the uninterruptible power module 20 is an AC-input and AC-output power module. The first path 24 includes an AC-to-DC conversion unit 242, and the AC-to-DC conversion unit 242 is an AC-to-DC converter. The second path 28 includes a DC-to-AC conversion unit 282. When the uninterruptible power module 20 receives the first power source P1, the AC-to-DC conversion unit 242 converts the AC first power source P1 into a first DC power source Pd1 to charge the energy storage unit 26, and the switch unit 22 is turned on so that the AC first power source P1 is outputted from the uninterruptible power module 20. When the uninterruptible power module 20 does not receive the first power source P1, the switch unit 22 is turned off, and the energy storage unit 26 outputs a second DC power source Pd2 to the DC-to-AC conversion unit 282. The DC-to-AC conversion unit 282 converts the second DC power source Pd2 into the AC second power source P2 so that the AC second power source P2 is outputted from the uninterruptible power module 20.

It is assumed that the charging module 40 is connected at the connection point A, namely the charging module 40 is connect to a path between the first power source P1 and the AC-to-DC conversion unit 242. When the first power source P1 is externally inputted into the uninterruptible power module 20, the first power source P1 is to be the first charging power source Pc1 and the first charging power source Pc1 is outputted to the charging module 40 connected at the connection point A.

In particular, the AC-to-DC conversion unit 242 may be a bidirectional AC-to-DC converter. Alternatively, the first path 24 further includes a DC-to-AC converter (not shown), and the uninterruptible power module 20 includes a switch (not shown) connected to a path between the first power source P1 and the connection point A. When the first power source P1 is not inputted or the first power source P1 is abnormal, the switch (not shown) is turned off by the uninterruptible power module 20 to disconnect the first power source P1, thereby avoiding damaging the charging module 40 due to the abnormal first power source P1. At this time, the uninterruptible power module 20 converts the first DC power source Pd1 into the first power source P1 by the bidirectional AC-to-DC conversion manner or the DC-to-AC conversion manner. Accordingly, the first power source P1 outputted from the AC-to-DC conversion unit 242 is to be the first charging power source Pc1 and the first charging power source Pc1 is delivered to the charging module 40 connected at the connection point A.

It is assumed that the charging module 40 is connected at the connection point B, namely the charging module 40 is connect to a path between the AC-to-DC conversion unit 242 and the energy storage unit 26. When the first power source P1 is externally inputted into the uninterruptible power module 20, the AC-to-DC conversion unit 242 converts the first power source P1 into the first DC power source Pd1. Accordingly, the first DC power source Pd1 outputted from the AC-to-DC conversion unit 242 is to be the first charging power source Pc1 and the first charging power source Pc1 is delivered to the charging module 40 connected at the connection point B. When the first power source P1 is not inputted, the first DC power source Pd1 outputted from the energy storage unit 26 is to be the first charging power source Pc1 and the first charging power source Pc1 is delivered to the charging module 40 connected at the connection point B.

It is assumed that the charging module 40 is connected at the connection point C, namely the charging module 40 is connect to a path between the energy storage unit 26 and the DC-to-AC conversion unit 282. Regardless of whether the first power source P1 is inputted or not, the second DC power source Pd2 outputted from the energy storage unit 26 is to be the first charging power source Pc1 and the first charging power source Pc1 is delivered to the charging module 40 connected at the connection point C.

It is assumed that the charging module 40 is connected at the connection point D, namely the charging module 40 is connect to a path between the DC-to-AC conversion unit 282 and the second power source P2. When the first power source P1 is externally inputted into the uninterruptible power module 20, the switch unit 22 of the uninterruptible power module 20 receives the first power source P1 to be the first charging power source Pc1 and the first charging power source Pc1 is delivered to the charging module 40 connected at the connection point D. When the first power source P1 is not inputted, the DC-to-AC conversion unit 282 converts the second DC power source Pd2 into the second power source P2 to be the first charging power source Pc1 and the first charging power source Pc1 is delivered to the charging module 40 connected at the connection point D.

In particular, the AC first power source P1 or second power source P2 is to be the AC first charging power source Pc1 when the charging module 40 is connected at the connection point A or connection point D. Since the uninterruptible power module 20 is an AC-input and AC-output power module, the conversion unit 42 of the charging module 40 needs to have a rectifying unit (not shown) to rectify the AC first charging power source Pc1 into the DC power source, and the rectified DC power source is converted into the second charging power source Pc2. The first DC power source Pd1 or the second DC power source Pd2 is to be the DC first charging power source Pc1 when the charging module 40 is connected at the connection point B or connection point C. The conversion unit 42 of the charging module 40 needs not to have a rectifying unit and directly converts the first charging power source Pc1 into the second charging power source Pc2.

Figure 3:
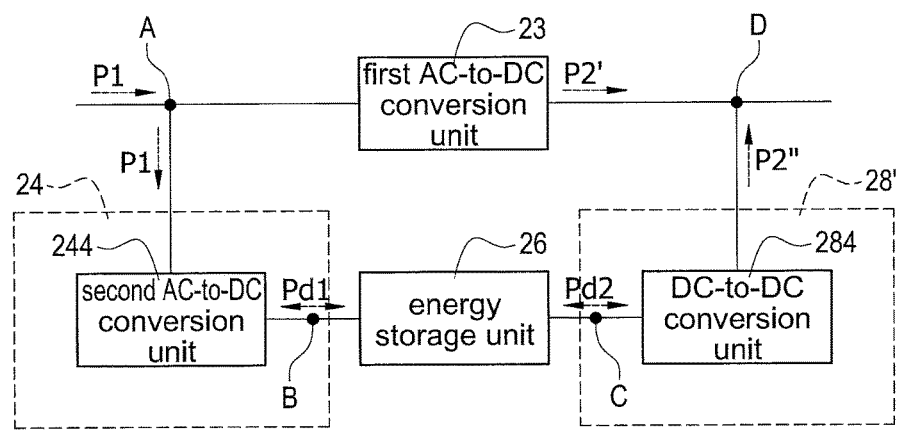
FIG. 3 shows a schematic circuit block diagram of the uninterruptible power module according to a second embodiment of the present invention.

Refer to FIG. 3, which shows a schematic circuit block diagram of the uninterruptible power module according to a second embodiment of the present invention. With reference also to FIG. 1A to FIG. 1C and FIG. 2, the difference between the uninterruptible power module 20' shown in FIG. 3 and the uninterruptible power module 20 shown in FIG. 2 is that the uninterruptible power module 20' is an AC-input and DC-output power module. The uninterruptible power module 20' includes a first AC-to-DC conversion unit 23, a first path 24, an energy storage unit 26, and a second path 28'. When the uninterruptible power module 20' receives the first power source P1, the uninterruptible power module 20' charges the energy storage unit 26 through the first path 24, and the first AC-to-DC conversion unit 23 converts the AC first power source P1 into the DC second power source P2'. When the uninterruptible power module 20' does not receive the first power source P1, the first AC-to-DC conversion unit 23 does not work. At this time, the energy storage unit 26 outputs the second power source P2'' through the second path 28' so that the second power source P2' or the second power source P2'' is outputted from the uninterruptible power module 20'. As shown in FIG. 1A to FIG. 1C and FIG. 3, the charging module 40 may be connected to any one of connection points A-D inside the uninterruptible power module 20', namely the connection points A-D are charging connection locations. The charging module 40 receives the first charging power source Pc1 which is generated from the first power source P1, the energy storage unit 26, or the second power source P2', P2'' and outputs the first charging power source Pc1 to the charging module 40.

The embodiment is similar to the first embodiment shown in FIG. 2, namely a single charging module 40 or multiple charging modules 40 can be connected to any one of connection points A-D inside the uninterruptible power module 20'. When multiple charging modules 40 are used in the intelligent uninterruptible power charging apparatus 100, one or more than one connection points (charging connection locations) of the uninterruptible power module 20' are used. For example, one charging module 40 is connected to a connection point A and another charging module 40 is connected a connection point C, or multiple charging modules 40 are connected to a connection point A. Accordingly, the charging modules 40 can be flexibly connected to different connection points (charging connection locations) of the uninterruptible power module 20' so as to increase the practicality and adaptability of the intelligent uninterruptible power charging apparatus 100. In this embodiment, the energy storage unit 26 is, for example but not limited to, a pluggable or expandable chargeable unit or power storage device.

In this embodiment, the uninterruptible power module 20' is an AC-input and DC-output power module. The first path 24 includes a second AC-to-DC conversion unit 244 and the second path 28' includes a DC-to-DC conversion unit 284. When the uninterruptible power module 20' receives the first power source P1, the second AC-to-DC conversion unit 244 converts the AC first power source P1 into the first DC power source Pd1 to charge the energy storage unit 26, and the first AC-to-DC conversion unit 23 converts the AC first power source P1 into the DC second power source P2' so that the DC second power source P2' is outputted from the uninterruptible power module 20'. When the uninterruptible power module 20' does not receive the first power source P1, the first AC-to-DC conversion unit 23 does not work. At this time, the energy storage unit 26 outputs the second DC power source Pd2 to the DC-to-DC conversion unit 284. The DC-to-DC conversion unit 284 converts the second DC power source Pd2 into the DC second power source P2'' so that the DC second power source P2'' is outputted from the uninterruptible power module 20'.

It is assumed that the charging module 40 is connected at the connection point A, namely the charging module 40 is connect to a path between the first power source P1 and the second AC-to-DC conversion unit 244. When the first power source P1 is externally inputted into the uninterruptible power module 20, the first power source P1 is to be the first charging power source Pc1 and the first charging power source Pc1 is delivered to the charging module 40 connected at the connection point A.

The embodiment is similar to the first embodiment shown in FIG. 2, namely the second AC-to-DC conversion unit 244 may be a bidirectional AC-to-DC converter. Alternatively, the first path 24 further includes a DC-to-AC converter (not shown), and the uninterruptible power module 20' includes a switch (not shown) connected to a path between the first power source P1 and the connection point A. When the first power source P1 is not inputted or the first power source P1 is abnormal, the switch (not shown) is turned off by the uninterruptible power module 20' to disconnect the first power source P1, thereby avoiding damaging the charging module 40 due to the abnormal first power source P1. At this time, the uninterruptible power module 20' converts the first DC power source Pd1 into the first power source P1 by the bidirectional AC-to-DC conversion manner or the DC-to-AC conversion manner. Accordingly, the first power source P1 outputted from the second AC-to-DC conversion unit 244 is to be the first charging power source Pc1 and the first charging power source Pc1 is delivered to the charging module 40 connected at the connection point A.

It is assumed that the charging module 40 is connected at the connection point B, namely the charging module 40 is connect to a path between the second AC-to-DC conversion unit 244 and the energy storage unit 26. When the first power source P1 is externally inputted into the uninterruptible power module 20', the second AC-to-DC conversion unit 244 of the uninterruptible power module 20' converts the first power source P1 into the first DC power source Pd1. Accordingly, the first DC power source Pd1 outputted from the second AC-to-DC conversion unit 244 is to be the first charging power source Pc1 and the first charging power source Pc1 is delivered to the charging module 40 connected at the connection point B. When the first power source P1 is not inputted, the first DC power source Pd1 outputted from the energy storage unit 26 is to be the first charging power source Pc1 and the first charging power source Pc1 is delivered to the charging module 40 connected at the connection point B.

It is assumed that the charging module 40 is connected at the connection point C, namely the charging module 40 is connect to a path between the energy storage unit 26 and the DC-to-DC conversion unit 284. Regardless of whether the first power source P1 is inputted or not, the second DC power source Pd2 outputted from the energy storage unit 26 is to be the first charging power source Pc1 and the first charging power source Pc1 is delivered to the charging module 40 connected at the connection point C.

It is assumed that the charging module 40 is connected at the connection point D, namely the charging module 40 is connect to a path between the DC-to-DC conversion unit 284 and the second power source P2' or the second power source P2". When the first power source P1 is externally inputted into the uninterruptible power module 20, the first AC-to-DC conversion unit 23 converts the first power source P1 into the second power source P2'. Accordingly, the second power source P2' outputted from the first AC-to-DC conversion unit 23 is to be the first charging power source Pc1 and the first charging power source Pc1 is delivered to the charging module 40 connected at the connection point D. When the first power source P1 is not inputted, the DC-to-DC conversion unit 284 converts the second DC power source Pd2 into the second power source P2" to be the first charging power source Pc1 and the first charging power source Pc1 is delivered to the charging module 40 connected at the connection point D.

In particular, the AC first power source P1 is to be the AC first charging power source Pc1 when the charging module 40 is connected at the connection point A. Since the uninterruptible power module 20' is an AC-input and DC-output power module, the conversion unit 42 of the charging module 40 needs to have a rectifying unit (not shown) to rectify the AC first charging power source Pc1 into the DC power source, and the rectified DC power source is converted into the second charging power source Pc2. The first DC power source Pd1, the second DC power source Pd2, the DC second power source P2', or the DC second power source P2" is to be the DC first charging power source Pc1 when the charging module 40 is connected at the connection point B, connection point C, or connection point D. The conversion unit 42 of the charging module 40 needs not to have a rectifying unit and directly converts the first charging power source Pc1 into the second charging power source Pc2.

Figure 4A:
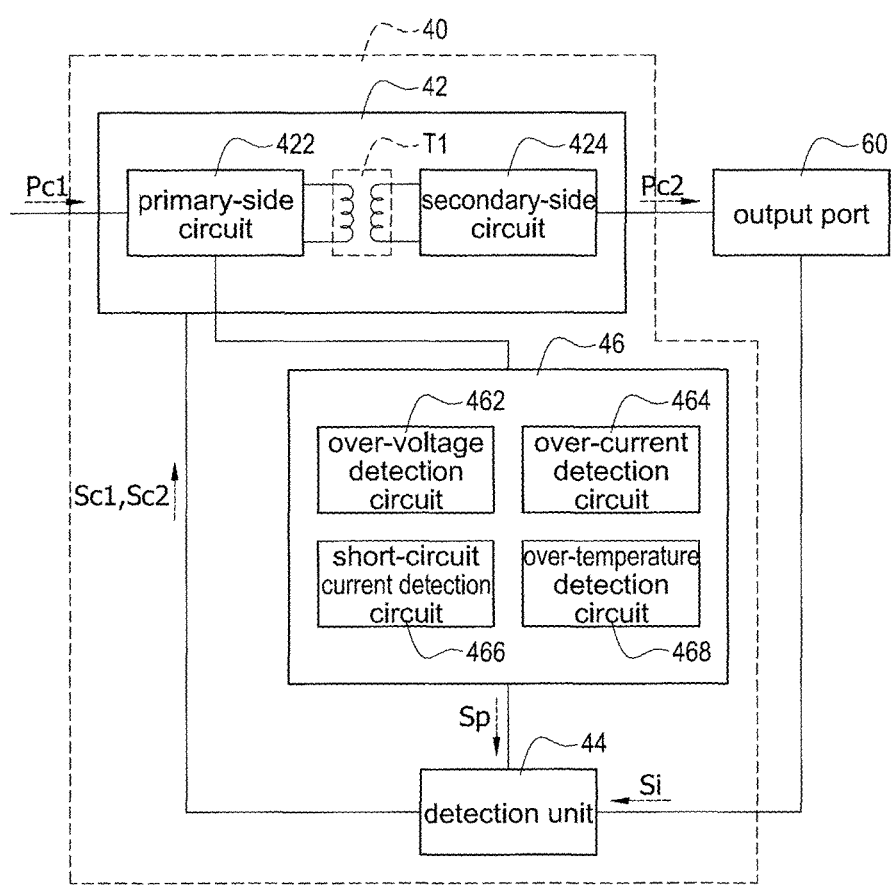
FIG. 4A shows a schematic circuit block diagram of a charging module according to a first embodiment of the present invention.

Refer to FIG. 4A, which shows a schematic circuit block diagram of a charging module according to a first embodiment of the present invention. With reference also to FIG. 1A. The conversion unit 42 of the charging module 40 may be an isolated converter with a primary-side circuit 422 and a secondary-side circuit 424, and the primary-side circuit 422 and the secondary-side circuit 424 are isolated by a transformer T1. In this embodiment, the protection unit 46 is connected between the primary-side circuit 422 and the detection unit 44. The protection unit 46 includes an over-voltage detection circuit 462, an over-current detection circuit 464, a short-circuit current detection circuit 466, or an over-temperature detection circuit 468. The over-voltage detection circuit 462, the over-current detection circuit 464, the short-circuit current detection circuit 466, or the over-temperature detection circuit 468 is provided to detect a voltage state, a current state, or a temperature state of the conversion unit 42. When the protection unit 46 detects that the conversion unit 42 through the primary-side circuit 422 is in an over-voltage condition, an over-current condition, a short-circuit current condition, or an over-temperature condition, the protection unit 46 determines that the conversion unit 42 is abnormal. In this embodiment, the conversion unit 42 may be also a non-isolated converter. The detail operations of the conversion unit are described below.

Figure 4B:
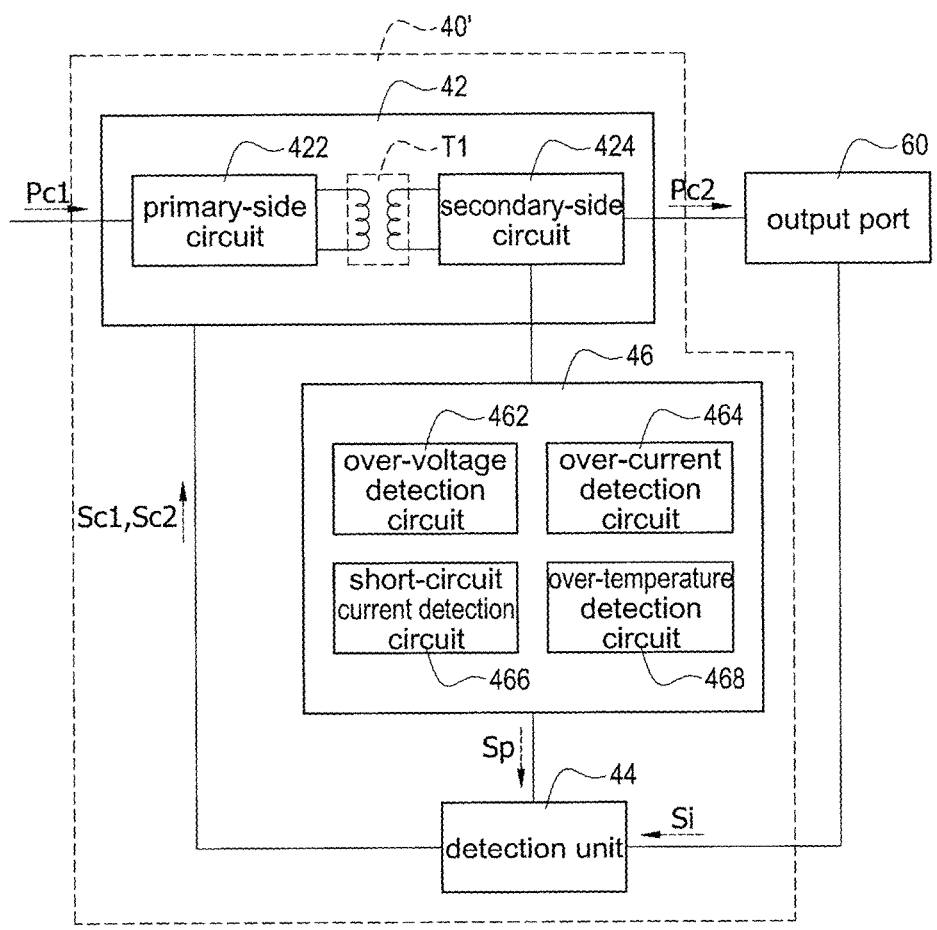
FIG. 4B shows a schematic circuit block diagram of the charging module according to a second embodiment of the present invention.

Refer to FIG. 4B, which shows a schematic circuit block diagram of the charging module according to a second embodiment of the present invention. With reference also to FIG. 1A. The difference between the charging module 40' shown in FIG. 4B and the charging module 40 shown in FIG. 4A is that the protection unit 46 is connected between the secondary-side circuit 424 and the detection unit 44. When the protection unit 46 detects that the conversion unit 42 through the secondary-side circuit 424 is in an over-voltage condition, an over-current condition, a short-circuit current condition, or an over-temperature condition, the protection unit 46 determines that the conversion unit 42 is abnormal. As shown in FIG. 4A and FIG. 4B, when the protection unit 46 determines that the conversion unit 42 is abnormal, the protection unit 46 outputs the protection signal Sp to the detection unit 44. After the detection unit 44 receives the protection signal Sp, the detection unit 44 outputs the second control signal Sc2 to control the conversion unit 42 not to output the second charging power source Pc2 so as to protect the electronic apparatus 200 connected to the output port 60.

Besides the over-voltage detection, the over-current detection, the short-circuit current detection, or the over-temperature detection, the protection unit 46 can be further used to detect an under-voltage condition of the conversion unit 42 by an under-voltage detection circuit (not shown) of the protection unit 46. The embodiments in FIG. 4A and FIG. 4B can be applied to the embodiments shown in FIG. 1B and FIG. 1C as well as the embodiment shown in FIG. 1A.

Figure 5A:
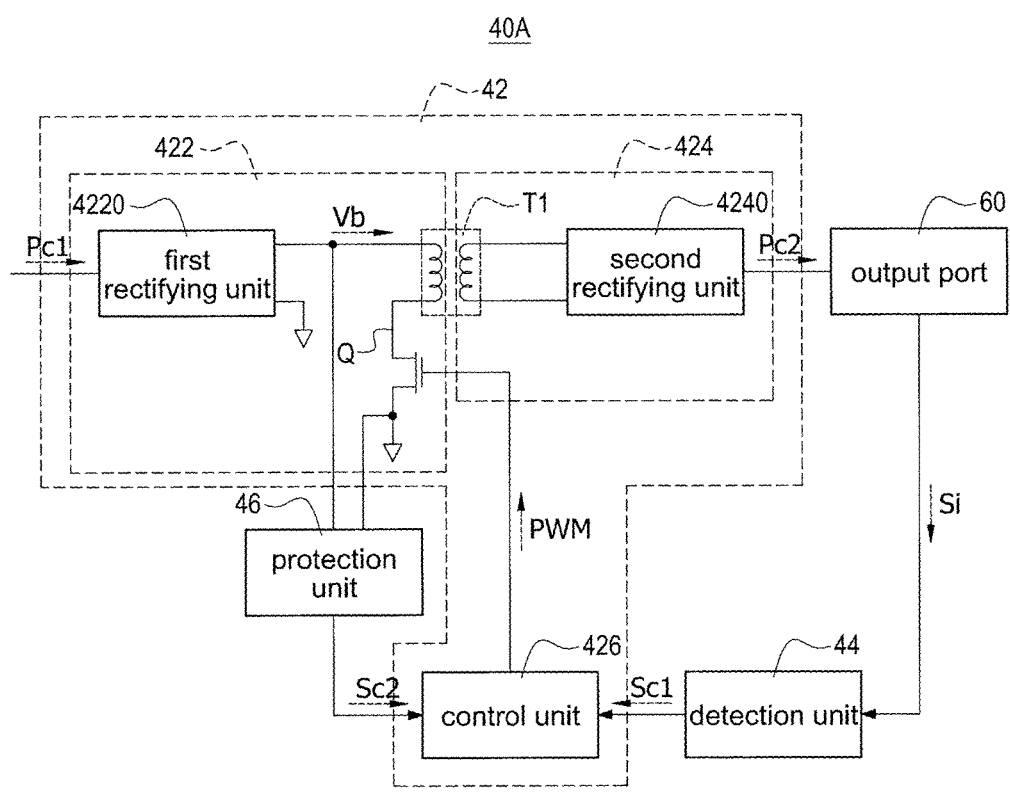
FIG. 5A shows a schematic circuit diagram of a conversion unit according to a first embodiment of the present invention.

Refer to FIG. 5, which shows a schematic circuit diagram of the conversion unit according to a second embodiment of the present invention. With reference also to FIG. 1A to FIG. 1C, FIG. 4A, and FIG. 4B. The embodiment is mainly disclosed as an example of combining a circuit architecture shown in FIG. 1C with the protection unit 46 connected to the primary-side circuit 422 shown in FIG. 4A. As shown in FIG. 5A, the conversion unit 42 of the charging module 40A is an isolated converter, and the conversion unit 42 includes a primary-side circuit 422, a secondary-side circuit 424, and a control unit 426. The primary-side circuit 422 of the conversion unit 42 includes a first rectifying unit 4220 and a switching switch Q. The first rectifying unit 4220 is connected to a primary side of the isolated transformer T1, and the first rectifying unit 4220 receives the first charging power source Pc1 and converts the first charging power source Pc1 into a rectified voltage Vb. The switching switch Q is connected to the primary side of the isolated transformer T1 and the control unit 426, and the switching switch Q is controlled to turn on or turn off by a drive signal PWM outputted from the control unit 426. The secondary-side circuit 424 of the conversion unit 42 includes a second rectifying unit 4240, and the second rectifying unit 4240 is connected to a secondary side of the isolated transformer T1 and the output port 60. The rectified voltage Vb is electromagnetically coupled to the second rectifying unit 4240 through the isolated transformer T1, and then the coupled rectified voltage Vb is rectified by the second rectifying unit 4240 to output the second charging power source Pc2 to the output port 60. When the drive signal PWM is a pulse-width modulation signal, the control unit 426 adjusts a duty cycle of the pulse-width modulation signal (drive signal PWM) to control the switching switch Q. Therefore, the control unit 426 can indirectly control the second rectifying unit 4240 connected at the secondary side of the isolated transformer T1 to output the second charging power source Pc2 so that the voltage level of the second charging power source Pc2 is corresponding to the duty cycle of the drive signal PWM. In this embodiment, the switching switch Q is, for example but not limited to, a MOSFET or a BJT.

The detection unit 44 is connected to the control unit 426 and the output port 60. The detection unit 44 receives the identification signal Si outputted from the output port 60 and outputs the first control signal Sc1 to the control unit 426 according to the identification signal Si. The control unit 426 outputs the drive signal PWM according to the first control signal Sc1 to adjust the second charging power source Pc2 outputted from the second rectifying unit 4240. The protection unit 46 is connected to the primary-side circuit 422 and the control unit 426, and the protection unit 46 detects the over-voltage condition, the over-current condition, the short-circuit current condition, or the over-temperature condition of the conversion unit 42 through the primary-side circuit 422. When the protection unit 46 detects that the conversion unit 42 occurs the over-voltage condition, the over-current condition, the short-circuit current condition, or the over-temperature condition, the protection unit 46 outputs the second control signal Sc2 to the control unit 426. When the control unit 426 receives the second control signal Sc2, the control unit 426 stops outputting the drive signal PWM to the switching switch Q, thereby stopping the power conversion of the conversion unit 42. In particular, when the conversion unit 42 is connected at the connection point B or the connection point C shown in FIG. 2, or the connection point B, the connection point C, or the connection point D shown in FIG. 3, the first charging power source Pc1 is the DC power source, and therefore the conversion unit 42 needs not to have the first rectifying unit 4220 to rectify the AC power source into the DC power source.

Figure 5B:
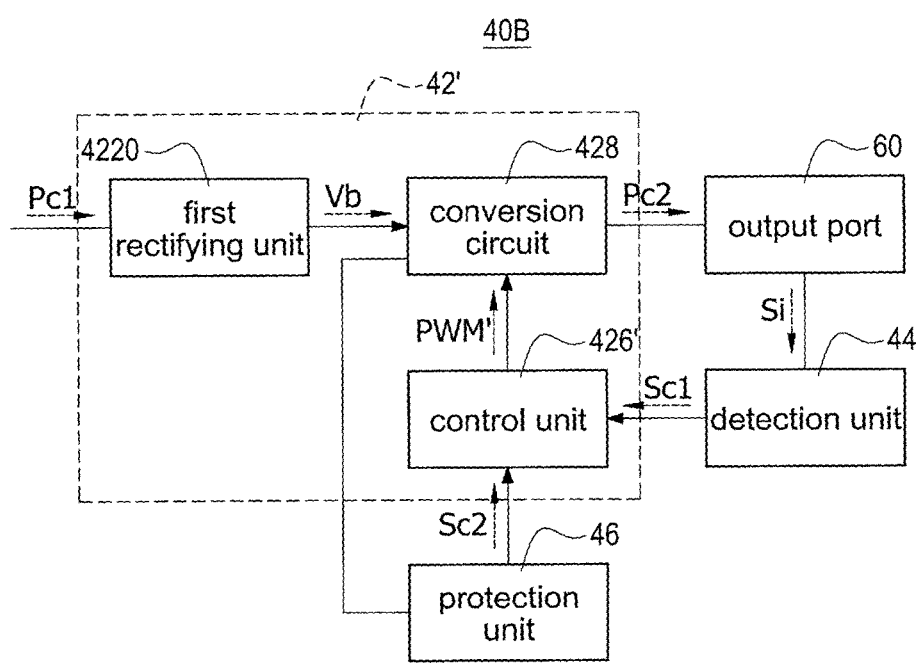
FIG. 5B shows a schematic circuit diagram of the conversion unit according to a second embodiment of the present invention.

Refer to FIG. 5B, which shows a schematic circuit diagram of the conversion unit according to a second embodiment of the present invention. With reference also to FIG. 1A to FIG. 1C, FIG. 4A, and FIG. 4B. The embodiment shown in FIG. 5B is similar to that shown in FIG. 1C. The conversion unit 42' of the charging module 40B is a non-isolated converter, and the conversion unit 42' includes a first rectifying unit 4220, a control unit 426', and a conversion circuit 428. The first rectifying unit 4220 receives the first charging power source Pc1 and converts the first charging power source Pc1 into a rectified voltage Vb. The conversion circuit 428 is connected to the first rectifying unit 4220, the output port 60, and the control unit 426'. The conversion circuit 428 receives the rectified voltage Vb, converts the rectified voltage Vb into the second charging power source Pc2, and adjusts the voltage level of the second charging power source Pc2 according to the drive signal PWM' outputted from the control unit 426'. When the drive signal PWM' is a pulse-width modulation signal, the control unit 426' adjusts a duty cycle of the pulse-width modulation signal (drive signal PWM') to control the conversion circuit 428. Therefore, the control unit 426' can indirectly control the second charging power source Pc2 so that the voltage level of the second charging power source Pc2 is corresponding to the duty cycle of the drive signal PWM'.

The detection unit 44 is connected to the control unit 426' and the output port 60. The detection unit 44 receives the identification signal Si outputted from the output port 60 and outputs the first control signal Sc1 to the control unit 426' according to the identification signal Si. The control unit 426 outputs the drive signal PWM' according to the first control signal Sc1 to adjust the second charging power source Pc2 outputted from the conversion circuit 428. The protection unit 46 is connected to the conversion circuit 428 and the control unit 426', and the protection unit 46 detects the over-voltage condition, the over-current condition, the short-circuit current condition, or the over-temperature condition of the conversion circuit 428. When the protection unit 46 detects that the conversion unit 42' occurs the over-voltage condition, the over-current condition, the short-circuit current condition, or the over-temperature condition, the protection unit 46 outputs the second control signal Sc2 to the control unit 426'. When the control unit 426' receives the second control signal Sc2, the control unit 426' stops outputting the drive signal PWM' to the conversion circuit 428, thereby stopping the power conversion of the conversion unit 42'. In particular, when the conversion unit 42' is connected at the connection point B or the connection point C shown in FIG. 2, or the connection point B, the connection point C, or the connection point D shown in FIG. 3, the first charging power source Pc1 is the DC power source, and therefore the conversion unit 42' needs not to have the first rectifying unit 4220 to rectify the AC power source into the DC power source.

Figure 6:
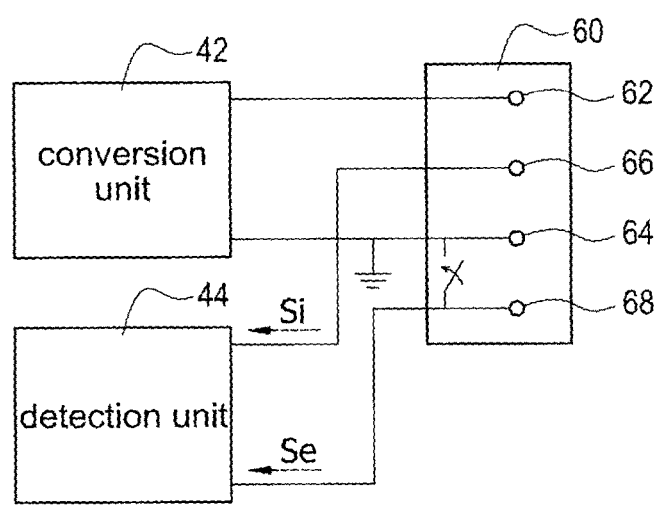
FIG. 6 shows a schematic circuit diagram of an output port according to the present invention.

Refer to FIG. 6, which shows a schematic circuit diagram of an output port according to the present invention. With reference also to FIG. 1A to FIG. 1C. The output port 60 includes a power pin 62, a ground pin 64, an identification pin 66, and a detection pin 68. The power pin 62 and the ground pin 64 are connected to the conversion unit 42, and the power pin 62 is provided to output the second charging power source Pc2. The identification pin 66 and the detection pin 68 are connected to the detection unit 44, and the identification pin 66 is provided to receive the identification signal Si. The detection pin 68 is provided to detect whether the electronic apparatus 200 is connected to the output port 60. When the electronic apparatus 200 is connected to the output port 60, the detection pin 68 is connected to the ground pin 64 of the output port 60 so that the detection pin 68 and the ground pin 64 are simultaneously grounded. At this time, the detection pin 68 outputs an activation signal Se to the detection unit 44 so that the detection unit 44 controls the conversion unit 42 to supply the second charging power source Pc2 to the electronic apparatus 200.

When the electronic apparatus 200 is not connected to the output port 60, the detection pin 68 is in a floating state without connecting to the ground pin 64. When the detection pin 68 is in the floating state, the activation signal Se is not outputted from the detection pin 68 to the detection unit 44 and the second charging power source Pc2 is not outputted from the conversion unit 42, thereby avoiding the waste of power. In this embodiment, the connection relationship of the electronic apparatus 200 is not only detected by the detection pin 68. In other words, the identification signal Si provided by the electronic apparatus 200 can be also used for the connection detection of the electronic apparatus 200.

In the present invention, the embodiments in FIG. 1A to FIG. 6 can be applied to others. For example, the embodiment shown in FIG. 1A can be, for example but not limited to, applied to the any one of embodiments in FIG. 4A, FIG. 5A, and FIG. 6, and the detail descriptions are omitted here for conciseness.

Figure 7:
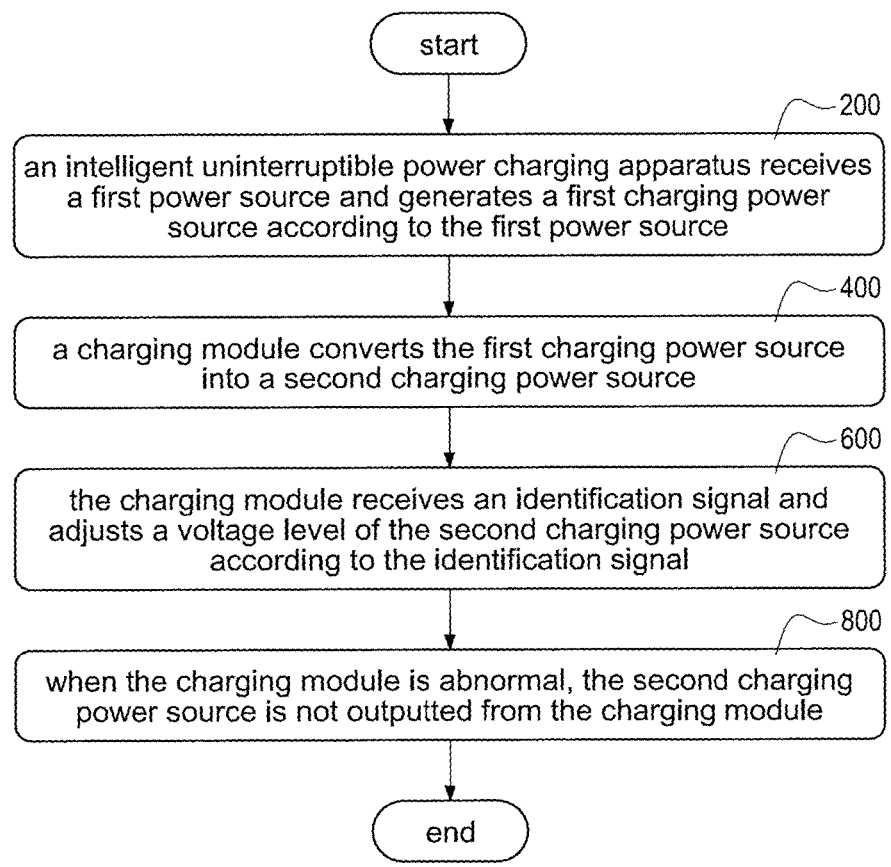
FIG. 7 shows a flowchart of a method of operating an intelligent uninterruptible power charging apparatus according to the present invention.

Refer to FIG. 7, which shows a flowchart of a method of operating an intelligent uninterruptible power charging apparatus according to the present invention. With reference also to FIG. 1A to FIG. 6. The intelligent uninterruptible power charging apparatus 100 includes an uninterruptible power module 20, 20' and a charging module 40. The operating method includes steps as follows. First, the intelligent uninterruptible power charging apparatus 100 receives a first power source P1 and generates a first charging power source Pc1 according to the first power source P1 (S200). The uninterruptible power module 20, 20' receives a first power source P1, converts the first power source P1 into a first DC power source Pd1, and delivers the first DC power source Pd1 to an energy storage unit 26. The uninterruptible power module 20, 20' converts a second DC power source Pd2 outputted from the energy storage unit 26 into a second power source P2, P2". According to connection points A-D of the charging module 40, the uninterruptible power module 20, 20' provides the first power source P1, the first DC power source Pd1, the second DC power source Pd2, or the second power source P2, P2', P2" to be a first charging power source Pc1, and the first charging power source Pc1 is outputted to the charging module 40 connected at the corresponding connection point. Afterward, the charging module 40 converts the first charging power source Pc1 into a second charging power source Pc2 (S400). After the charging module 40 receives the first charging power source Pc1, a conversion unit 42 of the charging module 40 converts the first charging power source Pc1 into the second charging power source Pc2, and the second charging power source Pc2 is outputted from an output port 60.

Afterward, the charging module 40 receives an identification signal Si and adjusts a voltage level of the second charging power source Pc2 according to the identification signal Si (S600). The intelligent uninterruptible power charging apparatus 100 detects whether an electronic apparatus 200 is connected to the charging module 40 through a detection pin 68. When the electronic apparatus 200 is connected to the charging module 40, the charging module 40 outputs the second charging power source Pc2 to the electronic apparatus 200. When the electronic apparatus 200 is not connected to the charging module 40, the second charging power source Pc2 is not outputted from the charging module 40. When the electronic apparatus 200 is connected to the output port 60 of the charging module 40, the second charging power source Pc2 is outputted to the electronic apparatus 200 through the output port 60, and the electronic apparatus 200 outputs the identification signal Si to a detection unit 44 of the charging module 40. When the detection unit 44 receives the identification signal Si, the detection unit 44 outputs a first control signal Sc1 to adjust the voltage level of the second charging power source Pc2. Finally, when the charging module 40 is abnormal, the second charging power source Pc2 is not outputted from the charging module 40 (S800). When a protection unit 46 detects that the conversion unit 42 occurs an over-voltage condition, an over-current condition, a short-circuit current condition, or an over-temperature condition, the protection unit 46 determines that the conversion unit 42 is abnormal and output a protection signal Sp to the detection unit 44. After the detection unit 44 receives the protection signal Sp, the detection unit 44 outputs a second control signal Sc2 to control the conversion unit 42 not to output the second charging power source Pc2 so as to protect the electronic apparatus 200 connected to the output port 60.

In conclusion, the present invention has the following advantages:

1. The uninterruptible power module of the intelligent uninterruptible power charging apparatus is provided to continuously charge the rear-end electronic apparatus regardless of whether a utility is available or not.

2. The identification signal is used to adjust the voltage level of the second charging power source so as to meet the requirement of different voltage levels for the electronic apparatus.

3. The detection pin is used to detect that the electronic apparatus is not connected to the charging module so as to interrupt outputting the second charging power source, thereby avoiding the waste of power.

4. The charging module can be flexibly connected to different connection points (charging connection locations) of the uninterruptible power module so as to increase the practicality and adaptability of the intelligent uninterruptible power charging apparatus.

5. The protection unit of the charging module may be connected at either the primary side or the secondary side of the conversion unit so as to flexibly install the protection unit on the circuit board.

6. The conversion unit of the charging module can be flexibly and appropriately selected to be an isolated convert or a non-isolated converter according to the power isolation or power non-isolation applications.

7. Besides the USB port, the output port can be other different types of transmission ports so as to flexibly and generally apply to the electronic apparatuses with different charging interfaces.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. An intelligent uninterruptible power charging apparatus comprising:
an uninterruptible power module;
a charging module connected to the uninterruptible power module; and
an output port connected to the charging module;
wherein the uninterruptible power module is configured to provide a first charging power source; the charging module is configured to convert the first charging power source into a second charging power source and output the second charging power source through the output port; when an electronic apparatus is connected to the output port, the charging module is configured to receive an identification signal outputted from the electronic apparatus and adjust a voltage level of the second charging power source according to the identification signal.

2. The intelligent uninterruptible power charging apparatus in claim 1, wherein the uninterruptible power module is configured to receive a first power source and the first power source is provided to charge an energy storage unit through a first path; when the uninterruptible power module does not receive the first power source, the energy storage unit is configured to output a second power source through a second path so that the second power source is outputted from the uninterruptible power module.

3. The intelligent uninterruptible power charging apparatus in claim 2, wherein the first path comprises:
an AC-to-DC conversion unit configured to convert the first power source into a first DC power source and deliver the first DC power source to the energy storage unit; wherein the charging module is connected to a path between the first power source and the AC-to-DC conversion unit, and the first power source is to be the first charging power source and the first charging power source is outputted from the uninterruptible power module to the charging module.

4. The intelligent uninterruptible power charging apparatus in claim 2, wherein the first path comprises:
an AC-to-DC conversion unit configured to convert the first power source into a first DC power source and deliver the first DC power source to the energy storage unit; wherein the charging module is connected to a path between the AC-to-DC conversion unit and the energy storage unit, and the first DC power source provided by the AC-to-DC conversion unit or the first DC power source provided by the energy storage unit is to be the first charging power source and the first charging power source is outputted from the uninterruptible power module to the charging module.

5. The intelligent uninterruptible power charging apparatus in claim 2, wherein the second path comprises:
a DC-to-AC conversion unit configured to receive a second DC power source outputted from the energy storage unit and convert the second DC power source into the second power source; wherein the charging module is connected to a path between the energy storage unit and the DC-to-AC conversion unit, and the second DC power source provided by the energy storage unit is to be the first charging power source and the first charging power source is outputted from the uninterruptible power module to the charging module.

6. The intelligent uninterruptible power charging apparatus in claim 2, wherein the second path comprises:
a DC-to-AC conversion unit configured to receive a second DC power source outputted from the energy storage unit and convert the second DC power source into the second power source; wherein the charging module is connected to a path between the DC-to-AC conversion unit and the second power source, and the first power source or the second power source provided by the DC-to-AC conversion unit is to be the first charging power source and the first charging power source is outputted from the uninterruptible power module to the charging module.

7. The intelligent uninterruptible power charging apparatus in claim 1, wherein the uninterruptible power module is configured to receive a first power source and convert the first power source into a second power source through a first AC-to-DC conversion unit, and the first power source is provided to charge an energy storage unit through a first path; when the uninterruptible power module does not receive the first power source, the energy storage unit is configured to output the second power source through a second path so that the second power source is outputted from the uninterruptible power module.

8. The intelligent uninterruptible power charging apparatus in claim 7, wherein the first path comprises:
a second AC-to-DC conversion unit configured to convert the first power source into a first DC power source and deliver the first DC power source to the energy storage unit; wherein the charging module is connected to a path between the first power source and the second AC-to-DC conversion unit, and the first power source is to be the first charging power source and the first charging power source is outputted from the uninterruptible power module to the charging module.

9. The intelligent uninterruptible power charging apparatus in claim 7, wherein the first path comprises:
a second AC-to-DC conversion unit configured to convert the first power source into a first DC power source and deliver the first DC power source to the energy storage unit; wherein the charging module is connected to a path between the second AC-to-DC conversion unit and the energy storage unit, and the first DC power source provided by the second AC-to-DC conversion unit or the first DC power source provided by the energy storage unit is to be the first charging power source and the first charging power source is outputted from the uninterruptible power module to the charging module.

10. The intelligent uninterruptible power charging apparatus in claim 7, wherein the second path comprises:
a DC-to-DC conversion unit configured to receive a second DC power source outputted from the energy storage unit and convert the second DC power source into the second power source; wherein the charging module is connected to a path between the energy storage unit and the DC-to-DC conversion unit, and the second DC power source provided by the energy storage unit is to be the first charging power source and the first charging power source is outputted from the uninterruptible power module to the charging module.

11. The intelligent uninterruptible power charging apparatus in claim 7, wherein the second path comprises:
a DC-to-DC conversion unit configured to receive a second DC power source outputted from the energy storage unit and convert the second DC power source into the second power source; wherein the charging module is connected to a path between the DC-to-DC conversion unit and the second power source, and the second power source provided by the first AC-to-DC conversion unit or the second power source provided by the DC-to-DC conversion unit is to be the first charging power source and the first charging power source is outputted from the uninterruptible power module to the charging module.

12. The intelligent uninterruptible power charging apparatus in claim 1, wherein the charging module comprises:
a conversion unit connected between the uninterruptible power module and the output port; and
a detection unit connected between the conversion unit and the output port;
wherein when the electronic apparatus is connected to the output port, the detection unit is configured to receive the identification signal outputted from the electronic apparatus and output a first control signal to the conversion unit according to the identification signal; the conversion unit is configured to receive the first charging power source and the first control signal, convert the first charging power source into the second charging power source, and adjust the voltage level of the second charging power source according to the first control signal.

13. The intelligent uninterruptible power charging apparatus in claim 12, wherein the charging module further comprises:
   a protection unit connected between the conversion unit and the detection unit or integrated in the detection unit; when the protection unit is configured to detect that the conversion unit is abnormal, the protection unit is configured to output a protection signal to the detection unit, and the detection unit is configured to output a second control signal to the conversion unit and control the conversion unit not to output the second charging power source.

14. The intelligent uninterruptible power charging apparatus in claim 13, wherein the protection unit comprises:
   an over-voltage detection circuit, an over-current detection circuit, a short-circuit current detection circuit, or an over-temperature detection circuit configured to detect a voltage state, a current state, or a temperature state of the conversion unit; wherein when the protection unit is configured to detect that the conversion unit occurs an over-voltage condition, an over-current condition, a short-circuit current condition, or an over-temperature condition, the protection unit is configured to output the protection signal to the detection unit.

15. The intelligent uninterruptible power charging apparatus in claim 13, wherein the conversion unit is an isolated converter with a primary side and a secondary side; wherein the protection unit is connected to the primary side of the isolated converter.

16. The intelligent uninterruptible power charging apparatus in claim 13, wherein the conversion unit is an isolated converter with a primary side and a secondary side; wherein the protection unit is connected to the secondary side of the isolated converter.

17. The intelligent uninterruptible power charging apparatus in claim 12, wherein the output port comprises:
   a detection pin connected to the detection unit and configured to detect whether the electronic apparatus is connected to the output port; when the electronic apparatus is connected to the output port, the detection pin is connected to a ground pin of the output port and the detection pin and the ground pin are simultaneously grounded, and the conversion unit is configured to output the second charging power source to the electronic apparatus; when the electronic apparatus is not connected to the output port, the detection pin is not connected to the ground pin of the output port, and the second charging power source is not outputted from the conversion unit.

18. A method of operating an intelligent uninterruptible power charging apparatus having an uninterruptible power module and a charging module; the method comprising steps of:
   (a) receiving a first power source and generating a first charging power source according to the first power source by the uninterruptible power module;
   (b) converting the first charging power source into a second charging power source by the charging module;
   (c) receiving an identification signal outputted from an electronic apparatus when the electronic apparatus is connected to the charging module, and adjusting a voltage level of the second charging power source according to the identification signal by the charging module; and
   (d) determining whether the charging module is abnormal according to a protection signal by the intelligent uninterruptible power charging apparatus, and not outputting the second charging power source from the charging module when the charging module is abnormal.

19. The method of operating the intelligent uninterruptible power charging apparatus in claim 18, wherein after the step (b) further comprises a step of:
   (b1) charging an energy storage unit of the uninterruptible power module by the first power source when the uninterruptible power module receives the first power source; receiving the first power source or the first charging power source generated from the energy storage unit by the charging module, and outputting the second charging power source to the electronic apparatus.

20. The method of operating the intelligent uninterruptible power charging apparatus in claim 18, wherein the step (c) further comprises a step of:
   (c1) determining whether the electronic apparatus is connected to the charging module through a detection pin; outputting the second charging power source from the charging module to the electronic apparatus when the electronic apparatus is connected to the charging module; not outputting the second charging power source from the charging module when the electronic apparatus is not connected to the charging module.

* * * * *